Patented Feb. 15, 1938

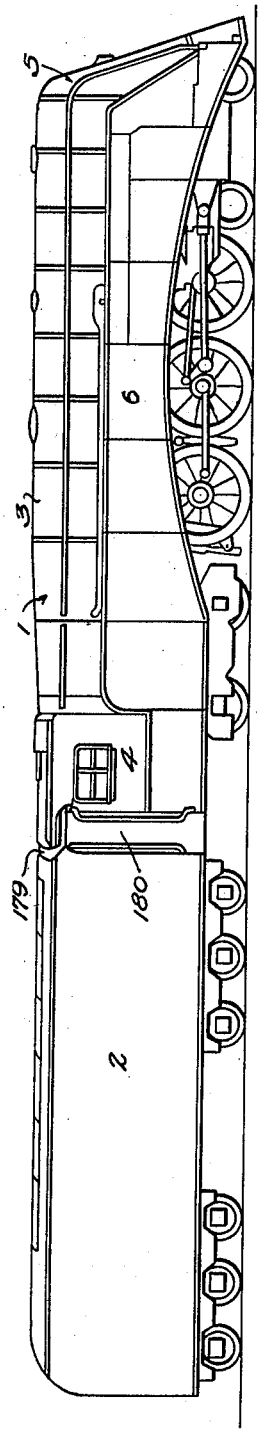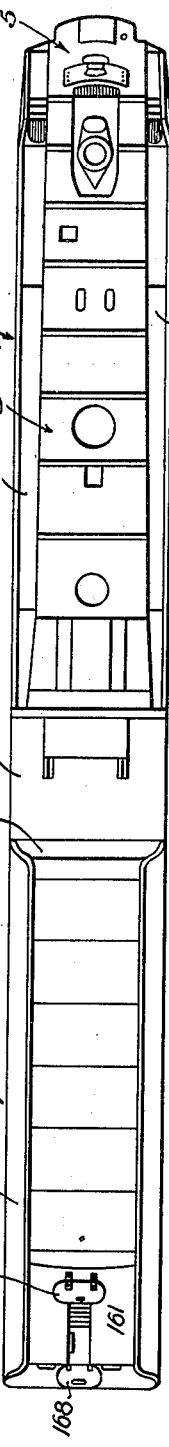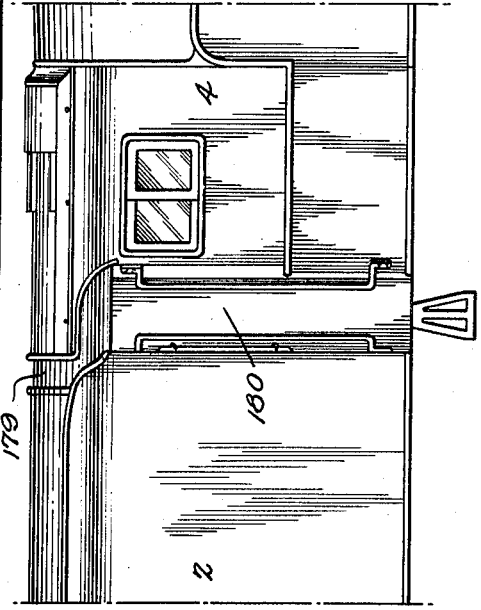

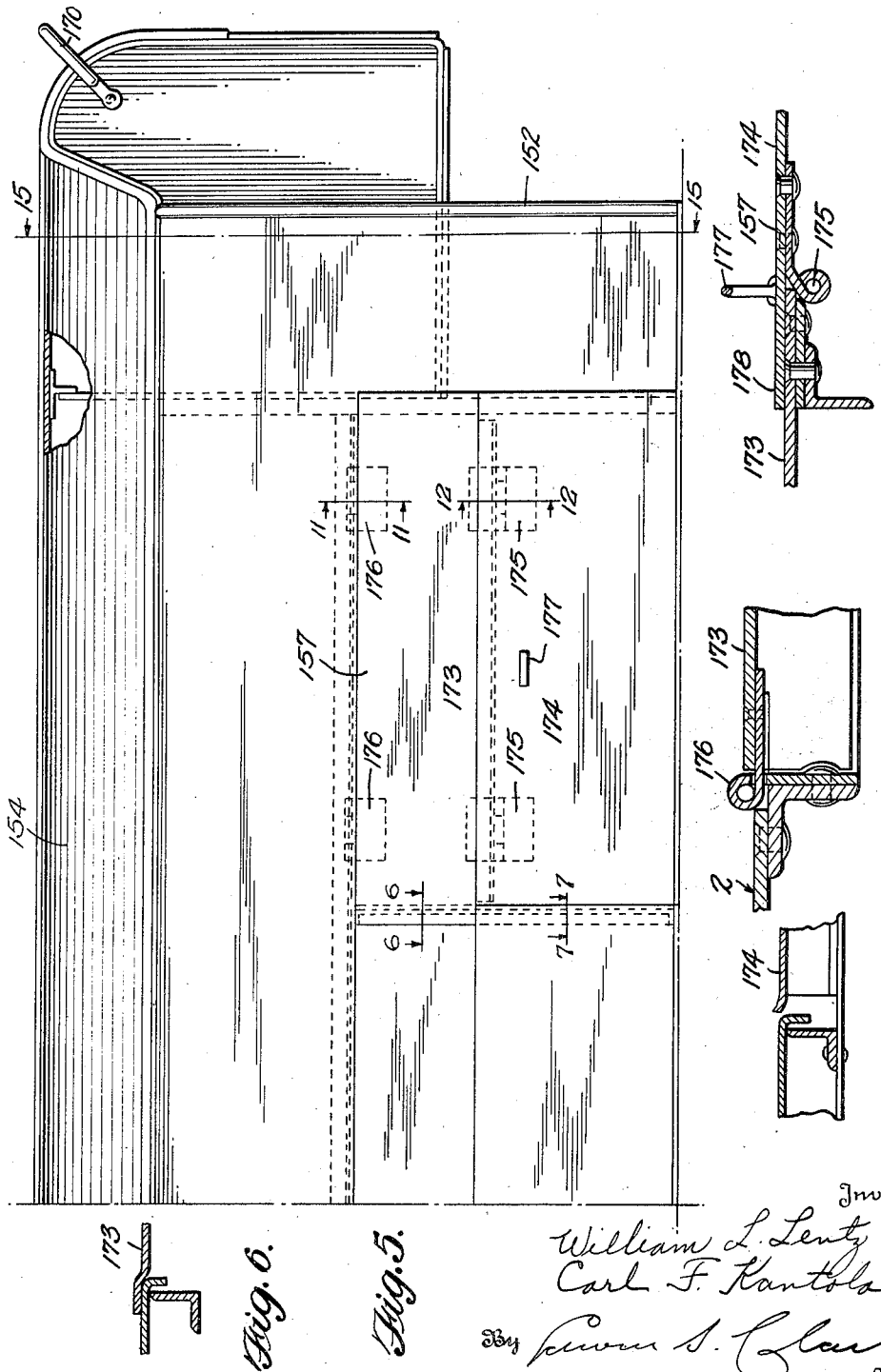

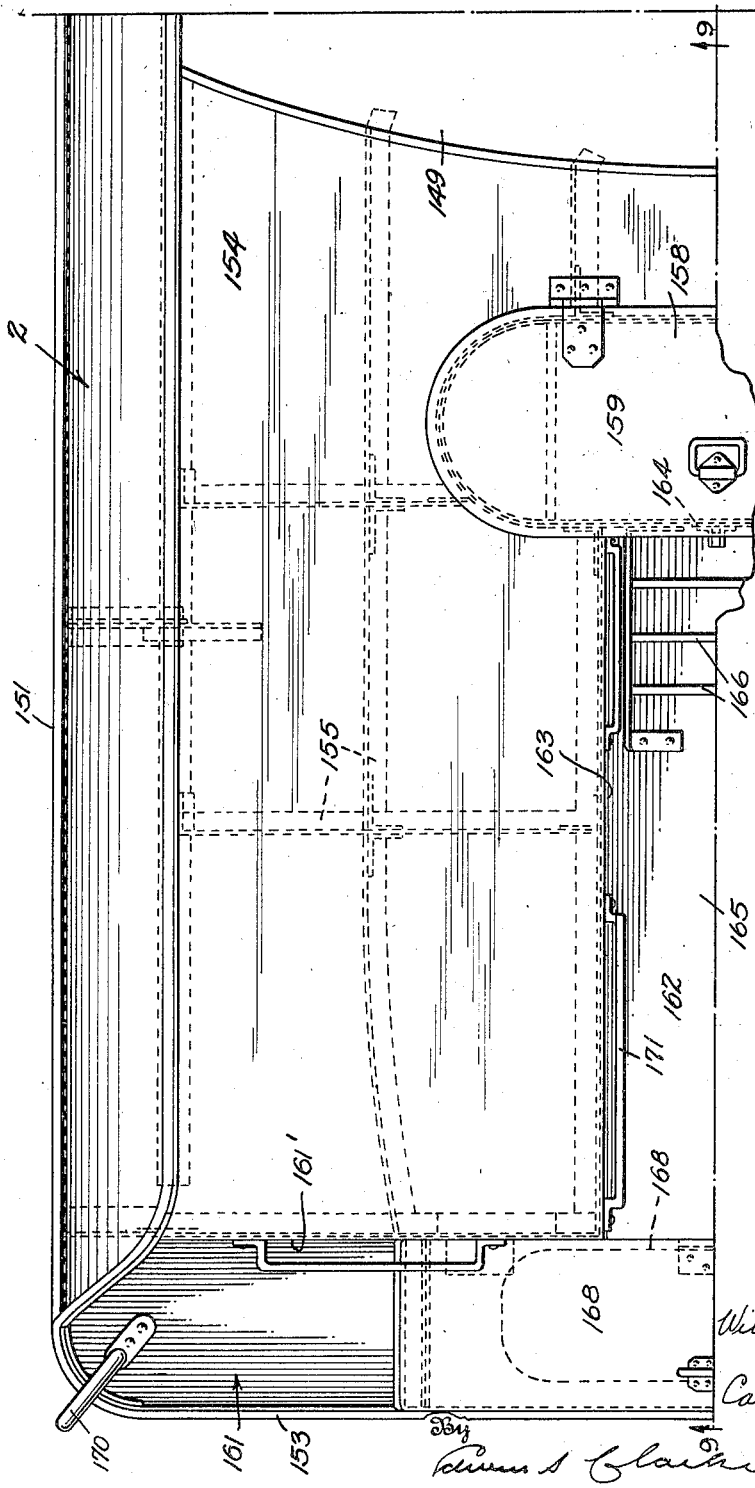

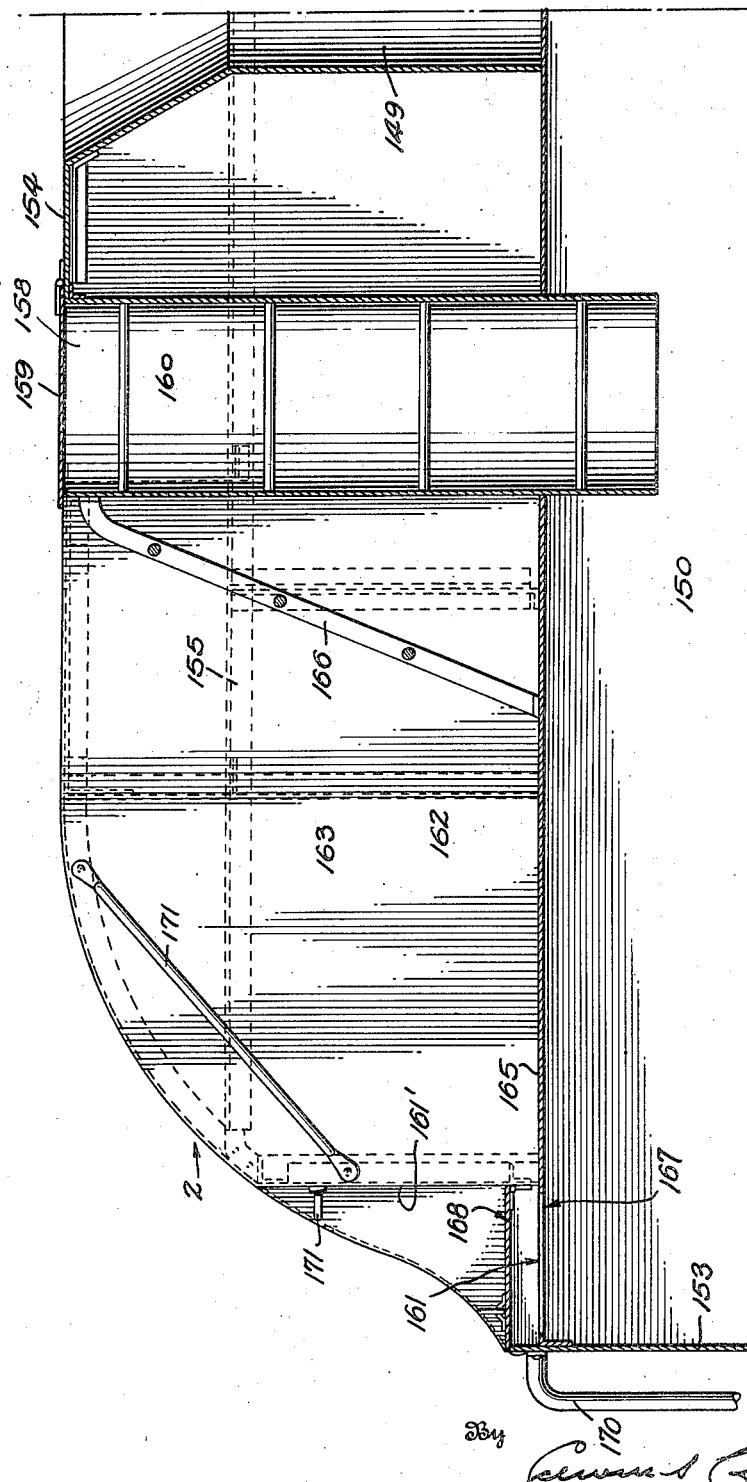

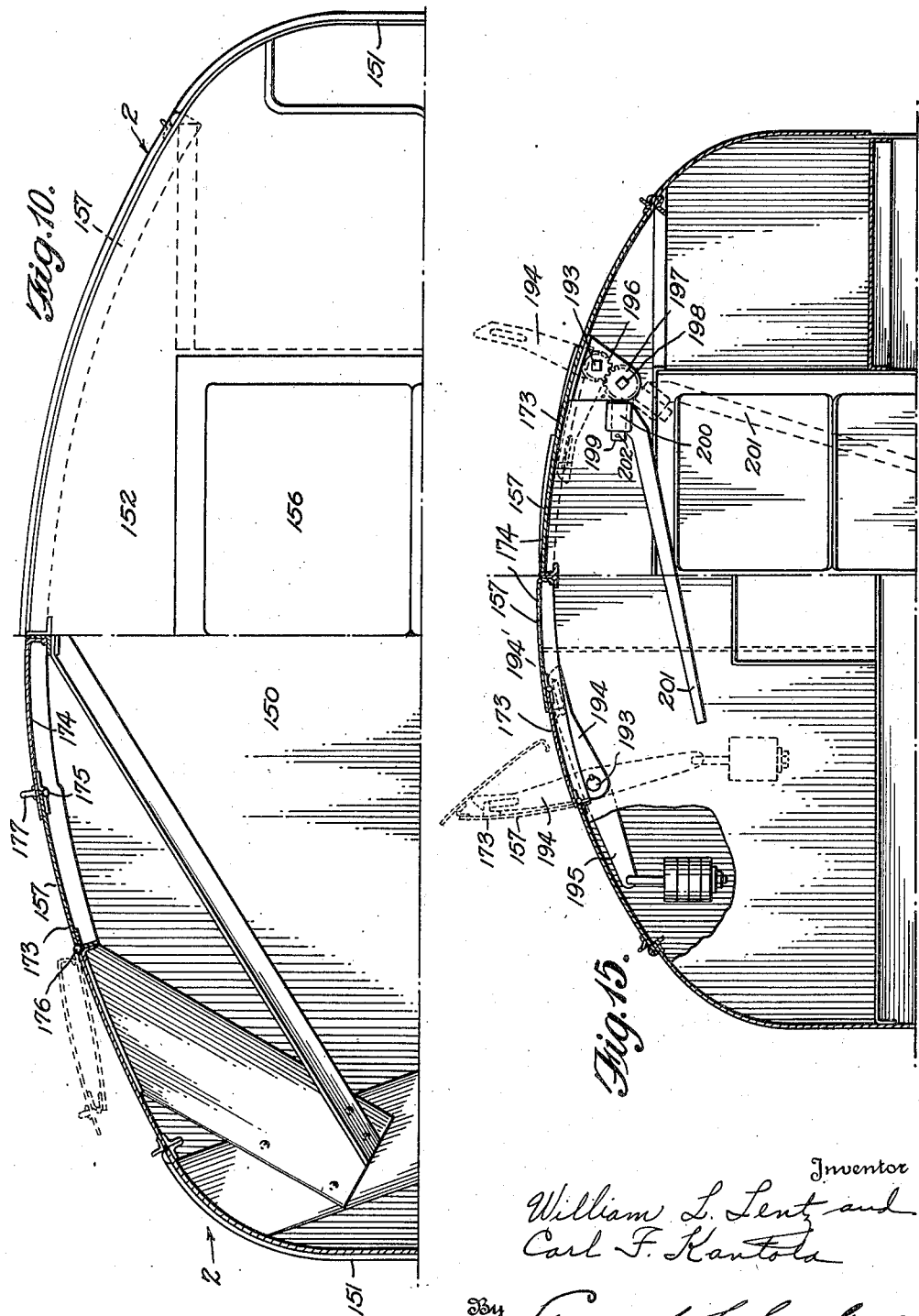

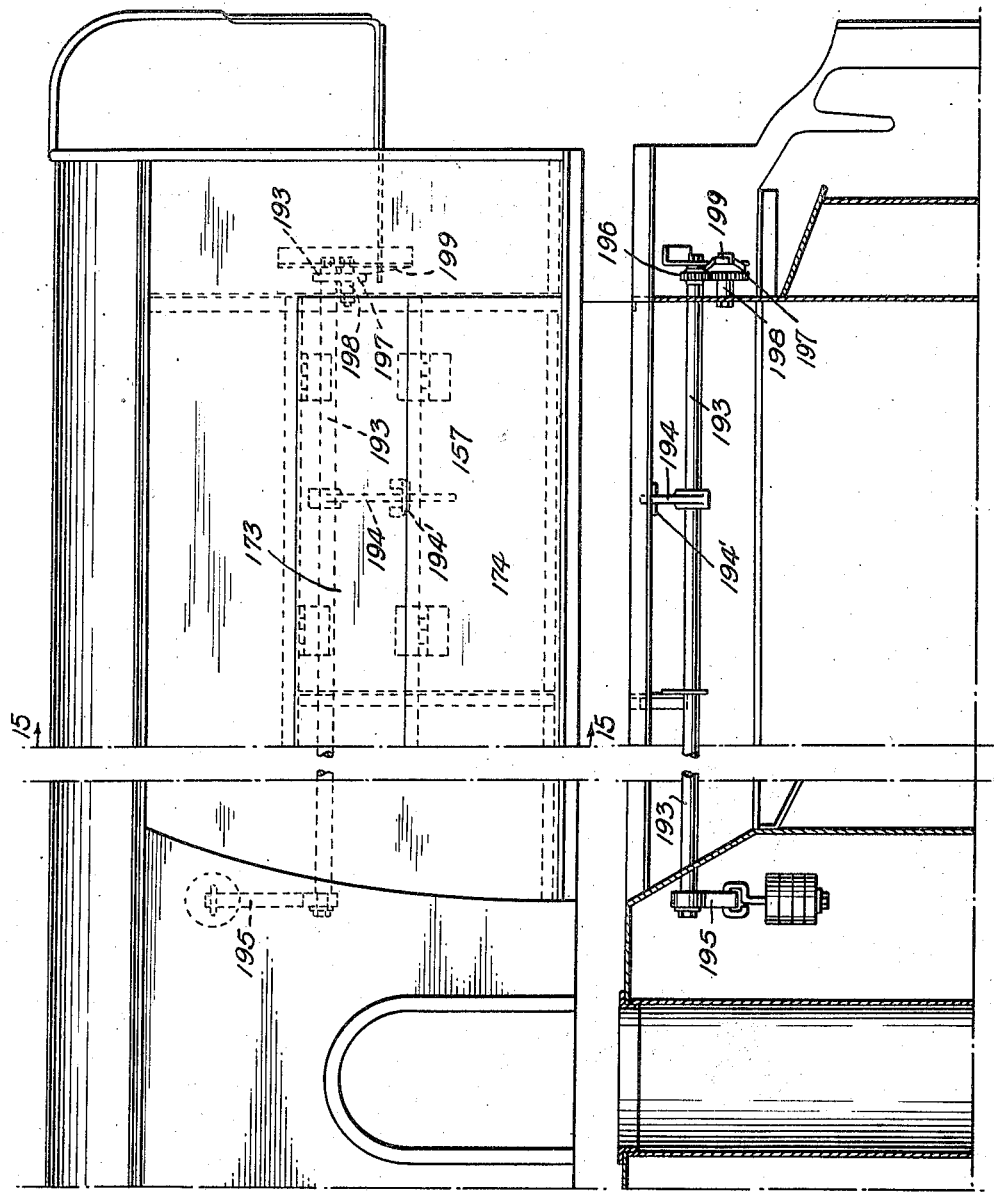

2,108,204

UNITED STATES PATENT OFFICE 2,108,204

LOCOMOTIVE TENDER

William L. Lentz, Tuckahoe, N. Y., and Carl F. Kantola, Ashtabula, Ohio, assignors to The New York Central Railroad Company, a corporation of New York Original application September 26, 1935, Serial No. 42,342. Divided and this application August 4, 1936, Serial No. 94,270

12 Claims. (Cl. 105—231)

This application is a division of our prior application, Serial No. 42,342, filed September 26, 1935.

The invention relates to locomotive tenders, and one object of the invention is to provide a streamline covered tender for locomotives which affords greater conveniences and advantages in servicing operations, eliminates loss of coal from the tender while in motion or being supplied with coal, back drafts in the cab and liability of freezing of coal in cold weather, and ensures greater cleanliness of operation of a train.

Another object of the invention is to provide novel and improved arrangement of and means for replenishing the coal bunker and water cistern of the tank with coal and water.

With these and other objects in view, the invention consists of the features of construction, combination and arrangement of parts, hereinafter fully described and claimed, reference being had to the accompanying drawings, in which:—

Fig. 1 is a side elevation of a streamlined tender embodying my invention, showing the same as used in connection with a streamlined locomotive.

Fig. 2 is a top plan view of the same.

Fig. 3 is a fragmentary elevation of portions of the parts shown in Fig. 1 on an enlarged scale.

Fig. 5 is an enlarged plan view of the front portion of the tender at one side of its longitudinal center line.

Figure 4:
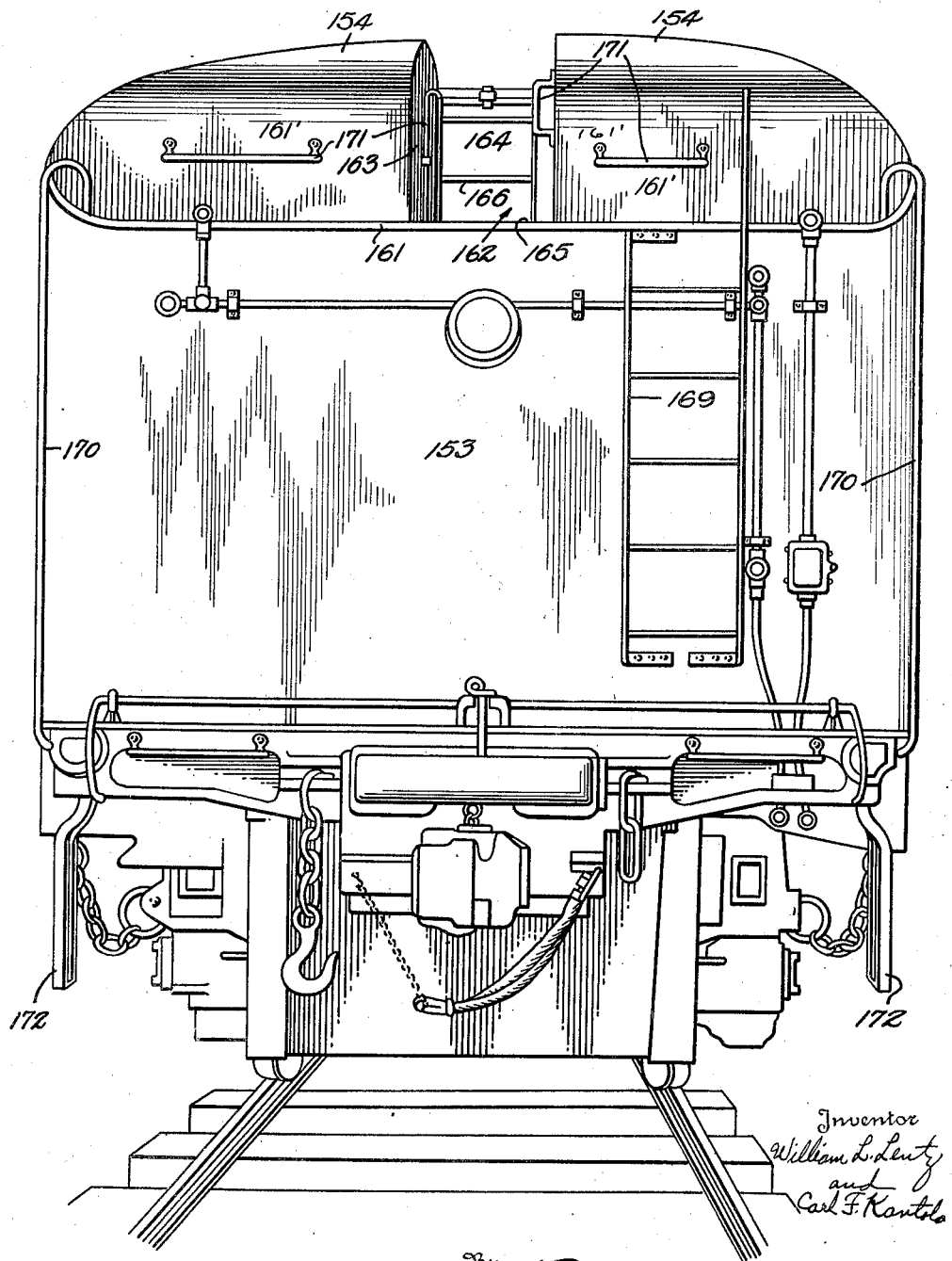
Fig. 4 is a view in rear elevation of the tender.

Figs. 6 and 7 are sections on lines 6—6 and 7—7 of Fig. 5.

Fig. 8 is a view similar to Fig. 5 of the rear portion of the tender.

Fig. 9 is a vertical longitudinal section on line 9—9 of Fig. 8.

Fig. 10 is a view partly in front elevation and partly in cross-section of the tender.

Figs. 11 and 12 are sections on lines 11—11 and 12—12 of Fig. 5.

Fig. 13 is a plan view of a part of the tender showing a modified type of fuel door operating means.

Fig. 14 is a vertical longitudinal section of the same.

Fig. 15 is a transverse section on the line 15—15 of Fig. 13 showing in dotted lines the operation of the door operating means shown thereby.

Referring now more particularly to the drawings, 1 designates a steam locomotive and 2 its tender of a construction embodying our invention. The locomotive 1 herein shown is of streamline form and is provided for this purpose with a streamline covering comprising a cowl portion 3 covering the boiler above the line of the running boards 3' from the cab 4 to the forward end of the smokebox, a hood portion 5 extending at the front of the locomotive from the forward end of the cowl portion to the tip of the locomotive pilot, and side panels or skirts 6 extending longitudinally from the rear end of the cab to the hood and vertically from points below the level of the running boards downwardly to a sufficient level to cover the ashpan, the major or a substantial portion of the running gear and other appurtenances ordinarily exposed to give an unattractive appearance to the locomotive and to cause wind resistance. The sides, roof portion and rear end wall of the tender 2 are also shaped to give a finished appearance and streamline effect thereto. The side panels of the locomotive, sides of the cab and side walls of the tender are so relatively arranged as to be in longitudinal alinement when the locomotive and tender are traveling on a straight track, so as to secure as far as possible a smooth flow of the air along the side of the locomotive and tender from end to end thereof. In order to make this straight line arrangement substantially continuous across the gaps between the sides and roofs of the cab and tender a construction of vestibule curtain or gap closing means is employed comprising an arched hood curtain 179 and side curtains 180, such as shown in our aforesaid application, Serial No. 42,342.

The tender 2 comprises a body or tank having the coal bunker or space 149 and water cistern or space 150 enclosed by sheet steel side, front, rear and top walls 151, 152, 153, and 154. The side walls 151 as previously stated lie in alinement with the side panels of the locomotive and extend down to the level of the lower edges of the panels 6. Said side walls, front, rear and top walls are formed of sheet iron or steel and are suitably united to each other and to an interior angle metal framing 155. As shown, the front wall 152 is provided with a coal gate or outlet 156 for the discharge of coal from the bunker. The major portion of the top wall or roof 154 lies in the same horizontal plane as the top of the cowling and roof of the locomotive cab and above the bunker space is provided with coal filling openings adapted to be closed by doors 157 arranged in transversely alined pairs. In rear of the bunker space is a water filling hole 158, normally closed by a hinged door 159, from which hole a duct or conductor 160 leads to the water space or cistern below. This hole 158 and the upper end of the duct lie at a level to permit the tender to be filled with facility from the high water spouts. Adjacent to the rear end of the tender the roof 154 is provided with a depressed platform portion 161 connected therewith by vertical walls 161' and between the filling hole 158 and the front of this platform portion 161 the roof is provided with a depressed alley or passageway 162 open at its rear end adjoining the platform 161 and connected at its sides and front end with the main roof by vertical walls 163 and 164, the floor 165 of said alley or passageway lying in the plane of the platform 161. At the forward end of the alley or passageway is a ladder 166 leading from the floor 165 to the top of the roof. In the platform 161 is a water filling hole 167 normally closed by a hinged door 168, which hole is arranged at a level to permit the tender to be supplied with water from low water spouts. The platform 161 provides a support on which an attendant may safely stand, and the passage 162 and ladder 166 provide a means whereby the attendant may readily reach the door 159 and travel from the rear end of the tender over the top thereof to reach and operate the doors 157 when said doors are hand operated from the top of the tender. A ladder 169 and hand rails or grabs 170 on the rear end wall of the tender, and suitably positioned hand rails or grabs 171 on the walls 161' and 163, allow the attendant to travel up and down with convenience and safety between the usual steps 172 at the rear end of the tender and the passageway and roof top. Each door 157 comprises outer and inner sections 173 and 174 hinged at their meeting edges centrally of the door, as at 175, the outer edge of the door section 173 being hinged to the roof, as at 176, and the outer edge of the door section 174 being provided with a handle 177 whereby the doors may be raised and swung outwardly to open position, in which operation the door section 173 swings over upon the roof surface and the door section 174 over upon the underside of the door section 173, as shown in dotted lines in Fig. 10. The hinged edge of the door section 174 may have an extension 178 beyond the hinges 175 to lap over the door section 173 in the closed position of the doors to prevent entrance of snow and moisture at this point and the adjacent edges of the different doors of each series may be arranged to lap for the same purpose.

In the tender structure above described the doors 157 are adapted to be manually opened and closed from the top of the tender by means of the handles 177. In Figs. 13 to 15, inclusive, however, we have shown means for operating the doors 157 either by manually operable or by fluid pressure operated power mechanism operated or controlled for operation by means located at the front of the tender and in the gangway between tender and locomotive. Referring to these figures, which show sets of operating devices for respectively simultaneously opening and closing each door or sets of doors 157 on each side of the center of the tender, it will be seen that a rocker shaft 193 is mounted on the tender beneath each door or set of the doors 157 at each side of the tender and that each shaft carries a lifting arm 194 having a sliding slot and pin connection 194' with the underside of the overlying door section 173, such that rocking movements of the shaft from and back to a normal position will effect opening and closing movements of the door or doors 157 connected to its lifting arm, as shown in full and dotted lines in Fig. 15. At a suitable point on each shaft 193 within the tender is a weighted arm 195 which counterbalances the weight of the doors actuated by said shaft so as to enable it to be easily operated. The forward end of each shaft 193 extends outwardly through the front wall of the tender and is exposed in the gangway space. On this end of shaft 193 is a toothed wheel or gear 196 which meshes with a toothed wheel or gear 197 on an operating shaft 198 to which is fixed an operating arm 199. The arm 199 is adapted to have applied thereto the socketed end 200 of an operating bar or lever 201, whereby the shaft 198 may be rocked to impart door opening and closing movements to the shaft 193. The lever 201 during this operation may be retained in engagement with the arm 199 by means of a pin 202 passed through a keeper opening in the arm. The bar or lever 201 may be the ordinary grate shaker bar of the locomotive which may be interchangeably used for grate shaking and door operating actions. By means of this bar or lever the coal doors on either side of the longitudinal center of the locomotive may be operated by applying the lever to operate either shaft 193. If desired, the two shafts 193 may be coupled together by connecting means, such as hereinafter described, so that by applying the lever to either shaft both shafts 193 may be simultaneously rocked to open or close all the doors 157 simultaneously.

From the foregoing description, taken in connection with the drawings, the construction of the tender will be readily understood without a further and extended description, and that the invention provides substantial advantages arising from the streamline enclosure of the bunker and water tank of the tender and the novel arrangement of filling doors adapting the tender, bunker and water tank to be supplied with coal and water and the water to be supplied with greater ease from high and low level water spouts. Also it will be seen that novel means for operating the doors, closing the opening to the coal bunker so as to enable these doors to be readily and conveniently opened and closed by means, if desired, so arranged as to adapt the doors to be operated without the necessity of the fireman or other attendant ascending to the roof of the tender. While the features of the invention are particularly designed to be employed in streamline tenders, it is to be understood that such features may be employed in tenders of other types, and that, while the structure herein disclosed is preferred, changes in the form, proportions and details of construction of the parts may be made, within the scope of the appended claims, without departing from the spirit or sacrificing any of the advantages of the invention.

What we claim is:—

1. A locomotive tender having coal and water receiving spaces, a streamlined shell enclosing said spaces and including top, front, rear and side walls, said front wall being provided with coal discharging means and said top wall being provided at its forward portion with a coal filling opening and in rear thereof with a high level water filling opening, said top wall terminating at its extreme rear end in a depressed platform having a low level water filling opening therein and a depressed passage leading forwardly therefrom toward the high level filling opening, steps in said passage giving access therefrom to the high level filling opening, and closures for said openings.

2. A locomotive having a cab, a tender having a coal bunker having its front wall provided with fuel discharging means and its top wall provided with a fuel filling opening, means for closing the gangway space between the locomotive cab and forward end of the tender, doors for closing the coal filling opening in the tender, and means connected to the doors and accessible from within the said closed gangway space for operating said doors.

3. A locomotive having a cab, a tender having a streamlined shell enclosing its coal and water receiving compartments, said shell including a roof portion arranged substantially at locomotive cab roof level and having a fuel filling opening therein, means for closing the gangway space between the locomotive cab and forward end of the tender, a door for closing said fuel filling opening comprising a section hinged to the roof portion at one side of the opening, and a section hinged to the first-named section so as to fold thereupon in its opening movement therewith, and means connected to the door and accessible within the gangway space for operating said door.

4. A locomotive having a cab, a tender having a coal bunker provided with a front wall and a top wall, the front wall having a fuel discharge outlet and the top wall having a fuel inlet, a door for closing the fuel inlet to the bunker, means for closing the gangway space between the locomotive cab and forward end of the tender, mechanism arranged within the bunker and coupled to the door for imparting opening and closing movements thereto, and means connected to the motion transmitting mechanism and operable from the outer side of the front wall of the tender and within the closed gangway space for actuating said motion transmitting mechanism.

5. A locomotive having a cab, a tender having a coal bunker provided with a front wall and a top wall, the front wall having a fuel discharge outlet and the top wall having a fuel inlet, a door for closing the fuel inlet to the bunker, means for closing the gangway space between the locomotive and front wall of the bunker, motion transmitting means arranged within the bunker and coupled to the door for imparting opening and closing movements thereto, said means including an operating part extending outward through said front wall, and gearing connected to said operating part on the outer side of the front wall of the bunker and accessible within the closed gangway space for actuating said motion transmitting means, said gearing including an actuating crank member and a shaker bar adapted to be connected therewith.

6. A locomotive tender having fuel and water containing spaces, a roof over said spaces having inlet openings therein respectively communicating with the coal and water spaces, a second roof over the first-named roof provided with fuel and water conductors opening therethrough and communicating with the said inlet openings, and closures for said conductors at the points where they open through the second roof.

7. A locomotive tender having fuel and water containing spaces, a roof over said spaces having a fuel inlet opening and longitudinally spaced apart high and low level water inlet openings therein communicating with the respective spaces, a second roof over the first-named roof terminating at its rear end in advance of said low level water inlet and provided with a walkway channel extending longitudinally between the high and low level water inlets, fuel and water conductors respectively leading from the fuel and high level water inlets to and opening to the exterior through the second roof, and closures for the low level water inlet and said conductors.

8. A locomotive tender having fuel and water containing spaces, a roof over said spaces having a fuel inlet opening and longitudinally spaced apart high and low level water inlet openings therein communicating with the respective spaces, a roof structure over the first-named roof terminating at its rear end in advance of said low level water inlet and provided with a walkway channel extending longitudinally between the high and low level water inlets, fuel and water conductors respectively leading from the fuel and high level water inlets to and opening to the exterior through said second roof structure, a ladder at the forward portion of the channel leading from the first-named roof to the top of said roof structure, and closures for the low level water inlet and said conductors.

9. A locomotive tender having longitudinally spaced fuel and water containing spaces, a roof structure thereover having a low level portion at one extreme end of the tender and a high level portion, the high level roof portion located between said end and the opposite end of the tender being provided with a fuel inlet to the fuel containing space and each roof portion being provided with a water inlet leading to the water containing space, and a stairway connecting said low and high level roof portions.

10. A locomotive tender having coal and water receiving spaces, a streamline shell enclosing said spaces and including, front, rear and side walls and a roof structure over said spaces, said front wall being provided with coal discharging means, and said roof structure being provided at its forward portion with a coal filling opening and at the extreme rear end of the tender with a water filling opening therein, and a communication passageway between the portions of the roof structure provided with the water filling opening and the coal filling opening.

11. A locomotive tender having coal and water receiving spaces, a streamline shell enclosing said spaces and including top, front, rear and side walls, said top wall being provided at its forward portion with a coal filling opening and a high level water filling opening at its extreme rear portion with a low level water filling opening located at the extreme rear end of the tender, said top wall having a depressed passage between the high level water filling opening and the low level water filling opening, the latter being arranged below the level of said top wall, and steps in said passage giving access between said water filling openings.

12. A locomotive tender having coal and water receiving spaces, a streamline shell enclosing said spaces and including top, front, side and rear walls, said front wall being provided with coal discharging means and said top wall being provided at its forward portion with a coal filling opening and in rear thereof with a high level water filling opening, a depressed portion in the top wall forming a passage leading from the extreme rear end of the tender forwardly toward said water filling opening, said depressed portion being provided at the rear end of the tender with a low level water filling opening, and steps in said passage giving access between said water filling opening.

WILLIAM L. LENTZ.
CARL F. KANTOLA.